(12) United States Patent
Sellamanickam et al.

(10) Patent No.: US 7,949,622 B2
(45) Date of Patent: May 24, 2011

(54) SYSTEM AND METHOD FOR GENERATING A CLASSIFIER MODEL FOR CLASSIFYING WEB CONTENT

(75) Inventors: Sundararajan Sellamanickam, Bangalore (IN); Sathiya Keerthi Selvaraj, Cupertino, CA (US)

(73) Assignee: Yahoo! Inc., Sunnyvale, CA (US)

( * ) Notice: Subject to any disclaimer, the term of this patent is extended or adjusted under 35 U.S.C. 154(b) by 742 days.

(21) Appl. No.: 11/955,965

(22) Filed: Dec. 13, 2007

(65) Prior Publication Data
US 2009/0157578 A1    Jun. 18, 2009

(51) Int. Cl.
*G06F 15/18*    (2006.01)
*G06N 5/00*    (2006.01)

(52) U.S. Cl. .......................................... 706/20; 706/59
(58) Field of Classification Search ............... 706/52, 706/20, 59; 348/143, 150
See application file for complete search history.

(56) References Cited

OTHER PUBLICATIONS

Cawley, G.C., Leave-One-Out Cross-Validation Based Model Selection Criteria for Weighted LS-SVMs, 2006 International Joint Conference on Neural Networks, pp. 1661-1668, Jul. 16-21, 2006.*

\* cited by examiner

*Primary Examiner* — David R Vincent
*Assistant Examiner* — Ola Olude-Afolabi
(74) *Attorney, Agent, or Firm* — Seth H. Ostrow; Ostrow Kaufman

(57) ABSTRACT

Generally, the present invention provides a method and computerized system for generating a classifier model, wherein the classifier model is operative to classify web content. The method and computerized system includes a first step of defining a plurality of predictive performance measures based on a leave one out (LOO) cross validation in terms of selectable model parameters. Exemplary predictive performance measures includes smoothened predictive measures such as F-measure, weighted error rate measure, area under curve measure, by way of example. The method and computerized system further includes deriving efficient analytical expressions for predictive performance measures to compute the LOO predictive performance and their derivatives. The next step is thereupon selecting a classifier model based on the LOO predictive performance.

18 Claims, 3 Drawing Sheets

SYSTEM AND METHOD FOR GENERATING A CLASSIFIER MODEL FOR CLASSIFYING WEB CONTENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates generally to classifier modeling and more specifically to generating a classifier model for classifying unbalanced web-based content.

BACKGROUND OF THE INVENTION

Classification problems of learning discrete valued outputs occur in many applications. Classifying web pages into different classes is an important operation for many web-based operations. For example, in a search-based operation, web page classification can significantly improve relevancy.

An important aspect of a classification system or model is the training and refinement of the model itself. Often, the number of training examples belonging to different classes is not uniform, and therefore provides an imbalanced training dataset. Imbalanced training sets make it very difficult to test or refine the model because the imbalance can potentially mask model shortcomings.

Existing techniques include using Gaussian process (GP) models, which are flexible, powerful and easy to implement. In a Bayesian GP setup, latent function values and hyperparameters involved in modeling are integrated based on prior calculations. Although, the required integrals are often not analytically tractable and closed form analytic expressions are not available.

Rather, GP model selection is a problem that typically occurs in the form of choosing hyperparameters that define the model. In existing systems, the choice is made by optimizing a well-defined objective function over the hyperparameters. Two commonly used approaches are marginal likelihood or evidence maximization and minimization of leave one out cross validation (LOO-CV) based average negative logarithmic predictive probability (NLP). In these approaches, the marginal likelihood is optimized with gradient information using Laplace or Expectation Propogation (EP) approximations. In one technique for approximation an Expectation-Maximization approach for determining hyperparameters, an EP is utilized to estimate the joint density of latent function values and the hyperparameters are optimized by maximizing a variational lower bound on the marginal likelihood.

Existing techniques for generating classifier models focus on measures like marginal likelihood and average negative logarithmic predictive probability measures. These techniques, in conjunction with a LOO-CV, fail to utilize other existing measures, as these measures are not typically applied to the classification of web-based content. Rather, the existing methods of classifier model selection are very indirect and the existing solutions do not account for imbalanced problems. As such, there exists a need for a technique for selecting a classifier model including a LOO-CV, whereby the classifier model can account for an unbalanced dataset, and hence the classifier model may classify web content with an improved degree of accuracy.

SUMMARY OF THE INVENTION

Generally, the present invention provides a method and computerized system for generating a classifier model, wherein the classifier model is operative to classify web content. The method and computerized system includes a first step of defining a plurality of predictive performance measures based on a leave one out (LOO) cross validation in terms of selectable model parameters. Exemplary predictive performance measures include smoothened predictive measures such as F-measure, weighted error rate measure, area under curve measure, by way of example. The method and computerized system further includes deriving efficient analytical expressions for predictive performance measures to compute the LOO predictive performance and their derivatives. The next step is thereupon selecting a classifier model based on the LOO predictive performance. Thereby, various web content can be classified using the classifier model.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

In the following description of the embodiments of the invention, reference is made to the accompanying drawings that form a part hereof, and in which is shown by way of illustration exemplary embodiments in which the invention may be practiced. It is to be understood that other embodiments may be utilized and structural changes may be made without departing from the scope of the present invention.

Figure 1:
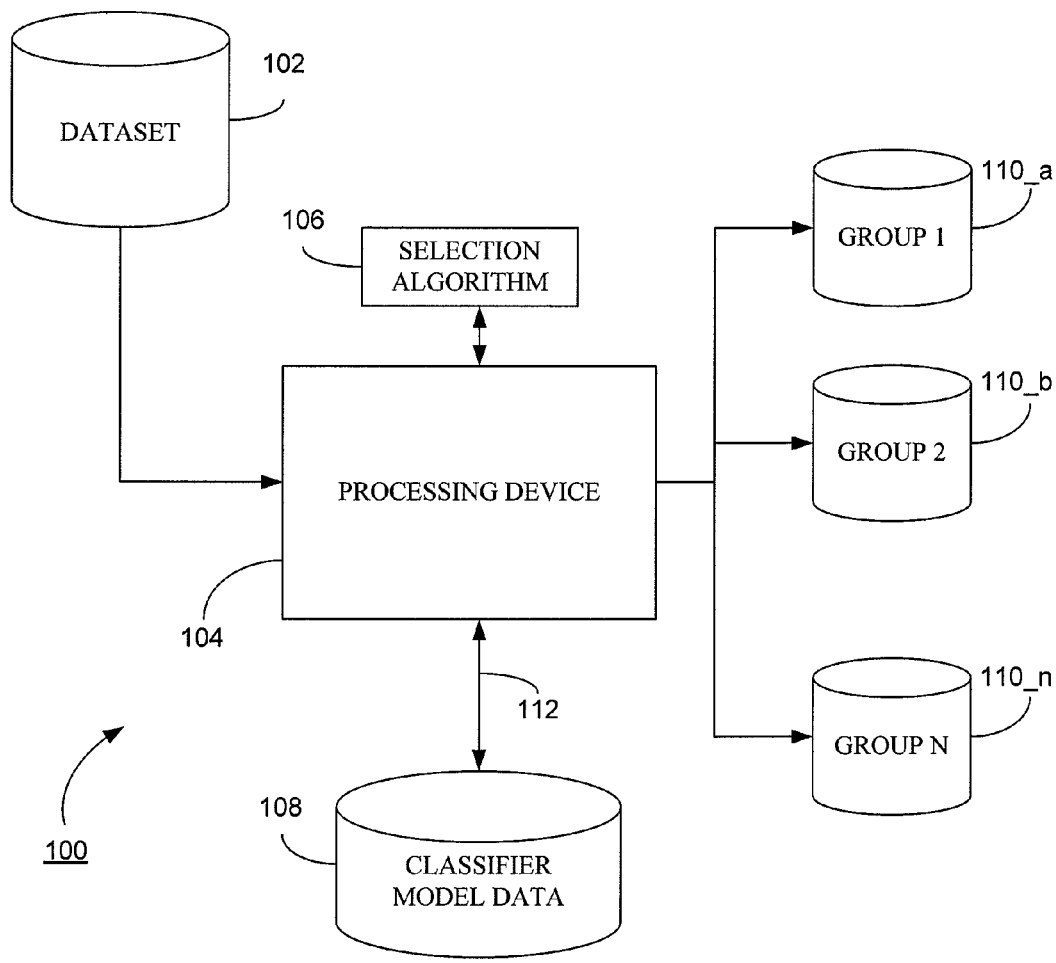
FIG. 1 illustrates a schematic block diagram of a processing system including a processing device operative to generate a classifier model and classify web content in accordance with one embodiment of the present invention.

FIG. 1 illustrates one embodiment of a computing system 100 or environment for classifying web content, in accordance with one embodiment of the present invention. The system 100 includes a dataset 102 having web content stored therein, a processing device 104, a selection algorithm 106, classifier model data 108 and databases 110a-110n (where n is any suitable integer) for storing the classified web content.

The dataset 102 may contain various types of content, also generally referred to as web content, where the content is content that is capable of being displayed or otherwise transmitted across a web-based connection. The content can be categorized into various groupings based on content classifications as recognized by one skilled in the art. Within the dataset 102, the content is not necessarily categorized or if categorized, may not be categorized relative to various defined groupings. For example, the content may be categorized into a first set of categories, but the processing device 104 may seek to categorize the dataset 102 into a different set of groupings.

The processing device 104 may be one or more processing devices operative to perform processing operations in response to executable instructions. The reading and execution of the instructions may be in accordance with known techniques, wherein the executable instructions that are read and executed by the processing device provide for generating the classifier model as described herein.

The selection algorithm 106, while illustrated as a separate box, may be one or more sets of executable code stored on one or more computer readable media, wherein the processing device 104 is operative to perform processing operations in response thereto. The classifier model data database 108 includes classifier model data 112 stored therein, wherein the classifier model data 112 provides selectable model parameters. The group databases 110a-110n may be one or more data storage devices operative to store the classified web content therein. For example, as described below, once a classifier model is selected, the model may be applied to the content of the dataset 102 and hence categorized data is stored in the corresponding group databases 110.

It is common for the dataset 102 to include unbalanced content, i.e. the content is not evenly distributed between the different categories. Therefore, the processing device 104, through the operation of executable instructions of the selection algorithm 106 provides for the generation of a classifier model capable of classifying the web content. As described above, unbalanced content can be problematic because shortcomings of the classifier model can be masked by the unbalanced content, whereby the classifier model generation of the processing device 104 overcomes these shortcomings.

Figure 2:
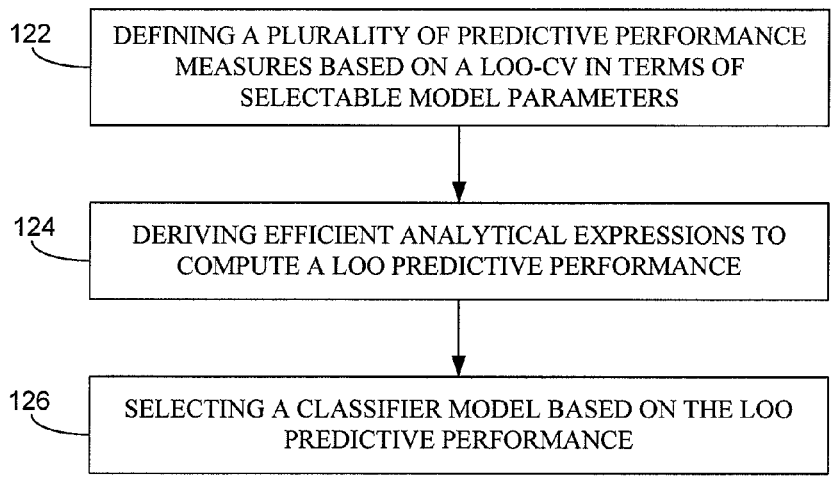
FIG. 2 illustrates a flowchart of the steps of one embodiment of a method for generating a classifier model.

In one embodiment, the processing device 104, in response to the executable instructions of the selection algorithm 106 may perform the processing operations illustrated in flowchart of FIG. 2. In one embodiment, a first step, step 120, includes defining a plurality of predictive performance measures based on a LOO-CV in terms of selectable model parameters.

Measures, like an F measure, Area Under Curve (AUC) and Weighted Error Rate (WER) are useful when dealing with imbalanced data sets, such as the dataset 102. In defining the measures, the technique considers the binary classification problem with class labels of +1 and −1. Assuming that there are n+ positive examples and n− negative examples, without the loss of generality, one can assume that n+<<n−, taking the positive examples as the minority class. In general, the performance of the classifier may be evaluated using counts of data samples {a, b, c, d} defined via a confusion matrix of table 1:

TABLE 1

|  | Positive (Pred.) | Negative (Pred.) |
|---|---|---|
| Positive (Actual) | a | b |
| Negative (Actual) | c | d |

Thereby, in this estimation, let n+=a+b and n−=c+d. The true positive rate (TP) is the proportion of positive data samples that were correctly classified and the false positive rate (FP) is the proportion of negative data samples that were incorrectly classified. The TP rate is the quotient of a/(a+b) and the FP rate is the quotient of c/(c+d). A misclassification rate (MCr) is therefore given by the quotient of (b+c)/n where $n=n_+ + n_-$ . . . . A precision quantity (P) is defined by the quotient of a/(a+c). Therefore, the F-measure is defined by Equation 1.

$$F\zeta(P, R) = \left(\frac{\zeta}{R} + \frac{1-\zeta}{P}\right)^{-1} \quad \text{Equation 1}$$

As such, the F-measure combines precision and recall into a single optimization criterion by taking their ξ-weighted harmonic mean. As a criterion for optimizing hyperparameters, F-measure can be computed on an evaluation or validation dataset. The present LOO-CV approach makes F-measure operations on small datasets extremely useful.

The present invention, through processing operations of the processing device 104 is operative to combine LOO based estimations and smoothened versions of the quantities {a, b, c, d} based on the below-noted equations for $A(\theta), B(\theta), C(\theta)$, and $D(\theta)$.

$$A(\theta) = \sum_{\substack{i=1 \\ y_i=+1}}^{n} p(y_i = +1 \mid x_i, S_{\setminus i}, \theta) \quad \text{Equation 2}$$

Here, θ denotes the hyperparameters. Further, $S_{\setminus i}$ denotes the dataset obtained by removing $i^{th}$ training example $(x_i, y_i)$ from the training dataset S consisting of all the 'n' training examples. In these calculations, $n_+ = a+b$, the value of $B(\theta)$ can then be equivalent to $n_+ − A(\theta)$; with $m_+$ denoting the number of examples predicted as positive, the computations parameterize it as $m_+(\theta)$ equals $A(\theta)$ plus $C(\theta)$. This is also represented by equation 3.

$$m_+(\theta) = \sum_{i=1}^{n} p(y_i = +1 \mid x_i, S_{\setminus i}, \theta) \quad \text{Equation 3}$$

As such, in the processing operations of the processing device 104, the smoothened F-measure can be defined by Equation 4.

$$F_\zeta(\theta) = \frac{A(\theta)}{\zeta n_+ + (1-\zeta)m_+(\theta)} \quad \text{Equation 4}$$

It is noted that $D(\theta)$ can be defined in a similar fashion based on $m(\theta)$ being equal to $B(\theta)$ plus $D(\theta)$. Thereby, using these quantities, other derived values like $TP(\theta)$ and $FP(\theta)$ can be defined as LOO based estimates. Similarly, various smoothened LOO estimates of criteria like AUC and WER can be obtained by Equations 5 and 6, respectively.

$$AUC(\theta) = \frac{1 + TP(\theta) - FP(\theta)}{2} \quad \text{Equation 5}$$

$$WER(\theta; \tau) = \frac{n_+ - TP(\theta) + \tau FP(\theta)}{n_+ + \tau n_-} \quad \text{Equation 6}$$

In Equation 6, the value τ is the ratio of the cost of misclassification of the negative class relative to that of the positive class. Thereby, using the above equations, the processing device 104, LOO-CV predictive distributions can be used to define various criteria that are smooth functions of hyperparameters resulting in smoothened LOO-CV measures.

Referring back to FIG. 2, a next step in the method for generating a classifier model, step 122, is deriving efficient analytical expressions based on the predictive performance measures to compute a LOO predictive performance. This derivation includes the optimization of hyperparameters.

An average negative logarithm of predictive probability (NLP) can be defined by Equation 7.

$$G(\theta) = -\frac{1}{n}\sum_{i=1}^{n} \log p(y_i \mid x_i, S_{\setminus i}, \theta)$$ Equation 7

The criteria for the NLP (Equation 7) and the smoothened LOO F-measure (Equation 4) depend upon the hyperparameters $\theta$ via predictive distribution of $p(y_i|x_i, S_{\setminus i}, \theta)$. Using a cumulative Gaussian likelihood, the hyperparameters can be defined based on the predictive distribution of Equation 8.

$$p(y_i \mid x_i, S_{\setminus i}, \theta) = \Phi\left(\frac{y_i(\gamma_1 \mu_{\setminus i} + \gamma_2)}{\sqrt{1 + \gamma_1^2 \sigma_{\setminus i}^2}}\right)$$ Equation 8

In Equation 8, the hyperparameters $\gamma_1$ and $\gamma_2$ are also known as scaling and bias parameters, controlling the slope and shift of the cumulative Gaussian function. The scale parameter $\gamma_1$ may be omitted in lieu of the signal variance hyperparameter $\beta_0$. It can be helpful for controlling the slope to have better approximation with other measures like smoothened F-measure. The bias parameter $\gamma_2$ helps in shifting the decision boundary with the probability value of 0.5. In general, the scale/bias parameters $\gamma_1$ and $\gamma_2$ are useful and can be optimized. Note that apart from $\gamma_1$ and $\gamma_2$, other hyperparameters (a subset of $\theta$) are involved in the computation of the LOO mean ($\mu_{\setminus i}$) and variance ($\sigma_{\setminus i}^2 \forall i$) values.

Thereby, within the processing device 104, the computation of Equation 8 uses the LOO mean ($\mu_{\setminus i}$) and variance ($\sigma_{\setminus i}^2 \forall i$) values. These values are computed differently based on Laplace and EP approximates. Additionally, hyperparameter optimization procedures are also different.

In the Laplace approximation, the LOO mean and variance are computed efficiently from the posterior solution $q(f|S, \theta)$ by removing contributions due the $i^{th}$ example. This processing operation can be performed by relating latent function posteriors obtained from Laplace and EP approximations and approximate cavity distributions. The approximate posterior predictive distribution of latent function $f_i$ is given by Equation 9.

$$p(f_i \mid x_i, S_{\setminus i}, \theta) = N(\mu_{\setminus i}, \sigma_{\setminus i}^2)$$ Equation 9

$$\mu_{\setminus i} = \hat{f}_i - \alpha_i \sigma_{\setminus i}^2$$

$$\sigma_{\setminus i}^2 = \frac{\tilde{\sigma}_i^2}{1 - w_{ii}\tilde{\sigma}_i^2}$$

In these equations, $\hat{f}$ equals $K\alpha$, $\alpha_i$ is the $i^{th}$ element of Equation 10:

$$\alpha = \Delta \log p(y|\hat{f}, \theta), \tilde{\sigma}_i^2 = k(i,i) - K(x_i)^T(K+W^{-1})^{-1}K(x_i)$$ Equation 10:

Here, K is an n×n kernel covariance matrix whose (i,j)th element is k(i,j) and $K(x_i)$ denotes $i^{th}$ column of the matrix K.

One of the most commonly used covariance function is squared exponential covariance function given by Equation 11.

$$cov(f(x_i), f(x_j)) = k(x_i, x_j)$$ Equation 11

$$= \beta_0 \exp\left(-\frac{1}{2}\sum_{k=1}^{D} \frac{(x_{i,k} - x_{j,k})^2}{\beta_k}\right)$$

Here, $x_i$ and $x_j$ represent D dimensional input vectors of $i^{th}$ and $j^{th}$ examples. Further, $\beta$s denote hyperparameters associated with the kernel matrix K. In these equations, $w_{ii}$ are the diagonal elements of the matrix W. The matrix W is given by Equation 12 and p(y|f) denotes the likelihood function and can be modeled as a cumulative Gaussian function. Note that W is evaluated at $f=\hat{f}$ and with independence assumption it is a diagonal matrix.

$$W = \nabla\nabla \log p(y|f)$$ Equation 12

Figure 3:
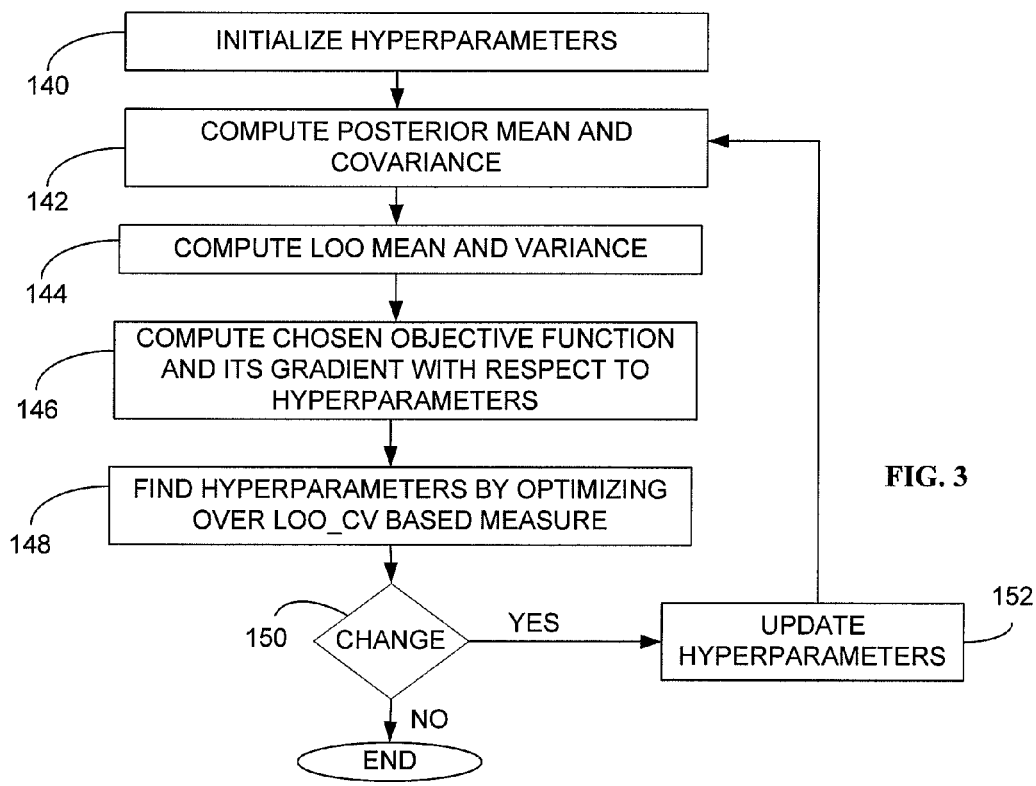
FIG. 3 illustrates a flowchart of the steps of one embodiment of Laplace cross validation hyperparameters optimization routine.

These expressions have a good intuitive interpretation. As such the optimization of the hyperparameters to compute the LOO predictive performance can be performed using this algorithm, wherein the steps are illustrated in the flowchart of FIG. 3.

A first step, step 140, is to initialize the hyperparameters $\theta$. For a given set of hyperparameters, the method includes computing the function and gradient. A second step, step 142, is to compute the posterior mean $\hat{f}$ using Newton's method and then the covariance $(K^{-1}+W)^{-1}$. A next step, step 144, is to compute the LOO mean and variance, such as using Equation 9 above. A next step, step 146, is to compute chosen objective function (LOO-CV measure), such as the exemplary techniques described above in Equations 4 or 7 and its gradient with respect to hyperparameters. A next step, step 148, is to optimize the hyperparameters by optimizing over the chosen LOO-CV based measure, using any standard gradient based optimization technique.

For each new set of hyperparameters that are determined during optimization, the steps 142 to 152 may be re-iterated until decisions step 150 reveals no significant change in the objective function value. The hyperparameters are updated in step 152 as each reiteration starts.

Figure 4:
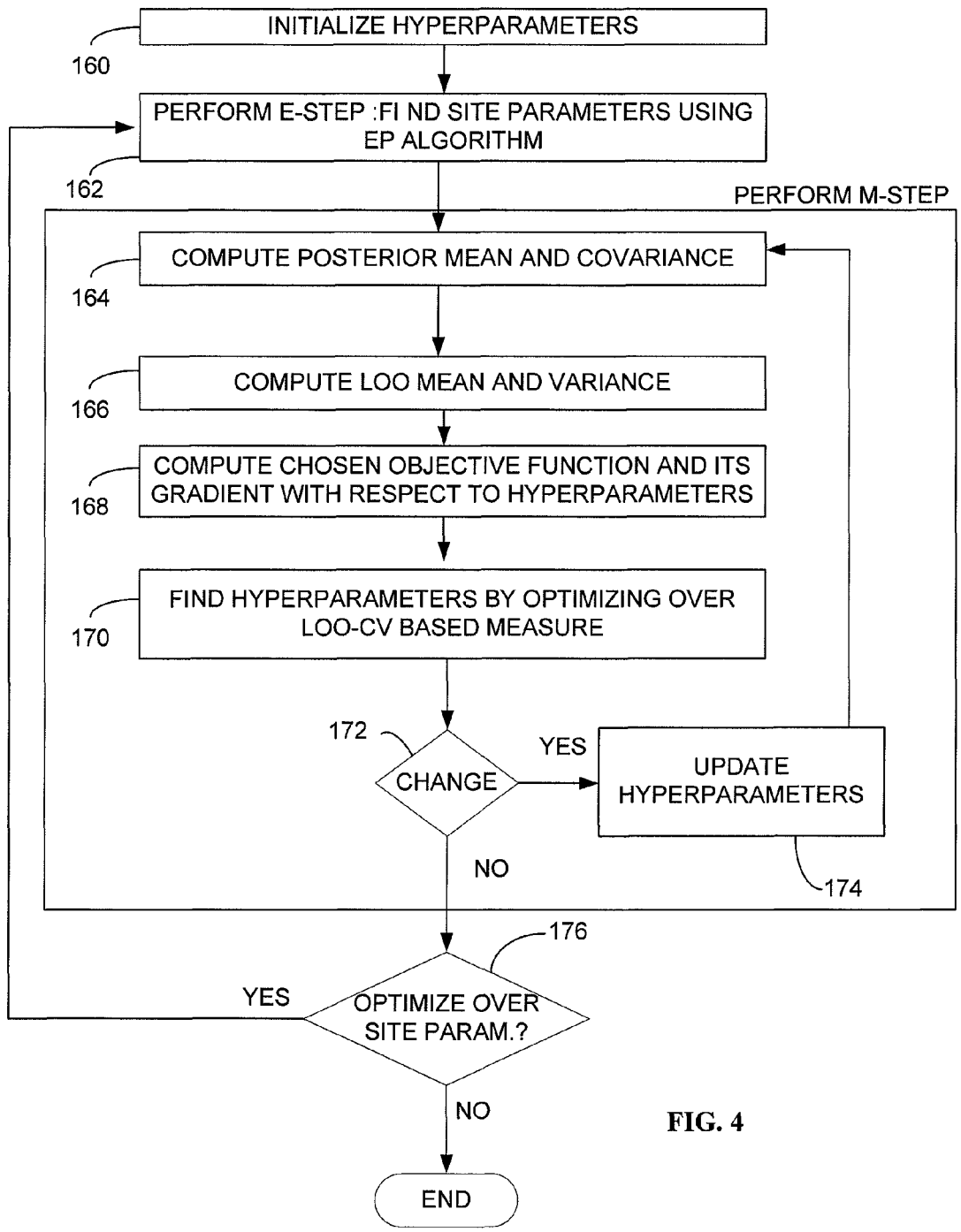
FIG. 4 illustrates a flowchart of the steps of one embodiment of an expectation propagation cross validation hyperparameters optimization routine.

With respect to FIG. 2, the final optimized hyperparameters along with the input data specifies the classifier model, which includes selecting a classifier model based on the LOO predictive performance, step 126.

Where FIG. 3 illustrates one technique relative to a Laplace CV algorithm, FIG. 4 illustrates the steps of an embodiment relative to an EP approximation. This technique uses an expectation-maximization (EM) approach for hyperparameter optimization because unlike Laplace approximations, gradient expressions involving implicit derivatives are not available due to the iterative nature of this EP algorithm. A first step, step 160, is to initialize the hyperparameters. A second step, step 162, is to perform the E step, whereby given the hyperparameters, determine the site parameters $\mu$ and $\Sigma$ and the posterior $q(f|S,\theta)=N(m,C)$ using the EP algorithm, as is known in the art.

A next step, is to perform the M-step, which includes finding the hyperparameters by optimizing over any LOO-CV based measure, such as Equations 4 or 7 using any standard gradient based optimization technique. This step involves a sequence of sub-steps 164, 166, 168, 172, 174 indicated in FIG. 4. One embodiment includes performing a one line search in this optimization process, wherein the following steps are performed as the hyperparameters are adjusted.

A first step, step 164, is to computer the posterior mean m and covariance C using Equation 13.

$$m = C\Sigma^{-1}\mu \quad C = (K^{-1} + \Sigma^{-1})^{-1} \quad \text{Equation 13}$$

Here, $\mu = (\mu_1, \mu_2, \ldots, \mu_n)^T$ and $\Sigma = \text{diag}(\sigma_1^2, \sigma_2, \ldots, \sigma_n)$ are the site parameters. A second step, step 166, is to compute the LOO mean and variance using Equation 14.

$$\mu_{\backslash i} = \sigma_{\backslash i}^2 \left( \frac{m_i}{C_{ii}} - \frac{\mu_i}{\sigma_i^2} \right) \quad \text{Equation 14}$$

$$\sigma_{\backslash i}^2 = ((C_{ii})^{-1} - \sigma_i^{-2})^{-1}$$

Here, $m_i$ represents the $i^{th}$ element of the vector m and $C_{ii}$ represents the $i^{th}$ diagonal element of the matrix C. A third step, step 168, is to compute the chosen objective function, such as using Equations 4 or 7 described above and its gradient with respect to hyperparameters. A next step, step 170, is to optimize the hyperparameters by optimizing over the chosen LOO-CV based measure, using any standard gradient based optimization technique.

The M-step includes thereby repeating steps 164, 166, 168, 170, 172, and 174 until there is no significant change in the objective function value for fixed site parameters, as indicated by the negative answer to the inquiry step 172. The algorithm includes thereby repeating E-step, step 162 and M-step (a sequence of sub-steps 164, 166, 168, 170, 172 and 174) until there is no significant change in the objective function value for changing site parameters, as indicated by the negative answer to the enquiry step 176.

Another factor in the generation of the classifier model relates to optimization, approximate predictive distributions and the derivatives thereof. From the definitions of various optimization criteria, such as Equations 4 or 7, the chosen measure and its derivatives can be obtained from the LOO predictive distributions $p(y_i|x_i, S_{\backslash i}, \theta)$ and their derivatives. Let $\theta_j$ be the $j^{th}$ component of the hyperparameter vector $\theta$, the derivate of the NLP measure can be given by Equation 15.

$$\frac{\partial G(\theta)}{\partial \theta_j} = -\frac{1}{n} \sum_{i=1}^{n} \frac{1}{\Phi(y_i z_i)} \frac{\partial p(y_i|x_i, S_{\backslash i}, \theta)}{\partial \theta_j} \quad \text{Equation 15}$$

Here $z_i$ is given by Equation 18. The derivative of the smoothened F-measure can be given by Equation 16.

$$\frac{\partial F_\xi(\theta)}{\partial \theta_j} = \frac{\eta(\theta) \frac{\partial A(\theta)}{\partial \theta_j} - A(\theta)(1-\zeta) \frac{\partial m_+(\theta)}{\partial \theta_j}}{\eta^2(\theta)} \quad \text{Equation 16}$$

Here, $\eta(\theta) = \xi n_+ + (1-\xi) m_+(\theta)$. Thereby, in performing the processing calculations, the operations use the LOO mean and variance values. In the case of EP approximation, analytical expressions to compute these quantities are already available.

In the case of Laplace approximations, computations can derive analytical expressions to compute these quantities efficiently, such as Equation 9 above.

Predictive distribution of class label is defined by Equation 17.

$$p(y_i|x_i, S_{\backslash i}, \theta) = \Phi\left(\frac{y_i(\gamma_1 \mu_{\backslash i} + \gamma_2)}{\sqrt{1 + \gamma_1^2 \sigma_{\backslash i}^2}}\right) \quad \text{Equation 17}$$

Then, using Equation 18 and Equation 19, this derives Equation 20.

$$z_i = \frac{\gamma_1 \mu_{\backslash i} + \gamma_2}{\sqrt{1 + \gamma_1^2 \sigma_{\backslash i}^2}} \quad \text{Equation 18}$$

$$N(z_i) = \frac{1}{\sqrt{2\pi}} \exp\left(-\frac{z_i^2}{2}\right) \quad \text{Equation 19}$$

$$\frac{\partial p(y_i|x_i, S_{\backslash i}, \theta)}{\partial \theta_j} = \frac{N(z_i) y_i \gamma_1}{\sqrt{1 + \gamma_1^2 \sigma_{\backslash i}^2}} \quad \text{Equation 20}$$

$$\left(\frac{\partial \mu_{\backslash i}}{\partial \theta_j} - \frac{1}{2} \frac{\gamma_1 z_i}{\sqrt{1 + \gamma_1^2 \sigma_{\backslash i}^2}} \frac{\partial \sigma_{\backslash i}^2}{\partial \theta_j}\right).$$

Herein, $\theta_j$ represents all elements of $\theta$ except $\gamma_1$ and $\gamma_2$ and hence generates Equations 21 and 22.

$$\frac{\partial p(y_i|x_i, S_{\backslash i}, \theta)}{\partial \gamma_1} = \frac{N(z_i) y_i}{\sqrt{1 + \gamma_1^2 \sigma_{\backslash i}^2}} \left(\mu_{\backslash i} - \frac{\gamma_1 z_i \sigma_{\backslash i}^2}{\sqrt{1 + \gamma_1^2 \sigma_{\backslash i}^2}}\right). \quad \text{Equation 21}$$

$$\frac{\partial p(y_i|x_i, S_{\backslash i}, \theta)}{\partial \gamma_2} = \frac{N(z_i) y_i}{\sqrt{1 + \gamma_1^2 \sigma_{\backslash i}^2}}. \quad \text{Equation 22}$$

Thus, for generating derivative values, the computations utilize $$\frac{\partial \mu_{\backslash i}}{\partial \theta_j} \text{ and}$$

$$\frac{\partial \sigma_{\backslash i}^2}{\partial \theta_i},$$

which can be obtained with Laplace and EP approximations.

In the Laplace approximation the derivatives of LOO mean and variance can be derived from known techniques. In the case of EP approximations, since the technique uses EM type optimization, derivative expressions can be derived, wherein the site parameters are fixed. For example, Equation 23 illustrates a derivative equation obtained from the expression for $\mu_{\backslash i}$ in Equation 14.

$$\frac{\partial \mu_{\backslash i}}{\partial \theta_j} = \frac{\mu_{\backslash i}}{\sigma_{\backslash i}^2} \frac{\partial \sigma_{\backslash i}^2}{\partial \theta_j} + \frac{\sigma_{\backslash i}^2}{(C_{ii})^2} \left(C_{ii} \frac{\partial m_i}{\partial \theta_j} - m_i \frac{\partial C_{ii}}{\partial \theta_j}\right). \quad \text{Equation 23}$$

Wherein, Equation 25 is based on the relationship of Equation 24.

$$\sigma_{\backslash i}^2 = ((C_{ii})^{-1} - \sigma_i^{-2})^{-1} \quad \text{Equation 24}$$

$$\frac{\partial \sigma_{\backslash i}^2}{\partial \theta_j} = \frac{\sigma_{\backslash i}^4}{(C_{ii})^2} \frac{\partial C_{ii}}{\partial \theta_j}. \quad \text{Equation 25}$$

Thereby, since $m=C\Sigma^{-1}\mu$, we have $$\frac{\partial m}{\partial \theta_j} = \frac{\partial C}{\partial \theta_j} \Sigma^{-1} \mu. \qquad \text{Equation 26}$$

The value of C can be rewritten as $C=K-K(K+\Sigma)^{-1}K$, this generates Equation 27.

$$\frac{\partial C}{\partial \theta_j} = (I-(K+\Sigma)^{-1}K)^T \frac{\partial K}{\partial \theta_j} (I-(K+\Sigma)^{-1}K). \qquad \text{Equation 27}$$

As such, based on Equation 27, therein provides the computation allowing for the derivation of efficient analytical expressions to compute the predictive performance.

With reference back to FIG. 1, the processing device 104 is operative to perform the above-described selection algorithm 106 using the classifier model data 112 from the model data database 108. Having generated a classifier model, the processing device 104 is therefore operative to classify the dataset 102, classifying the content and then assigning to designated groupings, stored in the corresponding databases 110. Through the method for generating the classifier model as performed by the processing device 104, the dataset 102 can be accordingly classified.

The benefit of the classification of the dataset can also be directly reflected by corresponding confidence scores associated with searching techniques. Given that the model development is for class prediction, selection criterion therefore measures predictive performance efficiently. As described above, the classifier model generation technique may utilize training examples for refinement, such as the iterative processes of FIGS. 3 and 4.

As such, the present method and processing system provides for the generation of a classifier model which is usable for an unbalanced data set. The iterative process allows for the selection of hyperparameters for the leave one out cross validation predictive performance technique. In response to the improved classifier model, subsequent data content is thereby more accurately and properly classified, allowing for improved usage considerations, such as search result accuracies in an online searching environment, by way of example.

FIGS. 1 through 4 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms memory and/or storage device may be used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A computerized method for generating a classifier model, the method comprising:
defining a plurality of predictive performance measures based on a leave one out (LOO) cross validation in terms of selectable model parameters;
deriving efficient analytical expressions by approximating one or more analytical expressions based on the plurality of predictive performance measures to compute a LOO predictive performance;
selecting a classifier model based on the LOO predictive performance; and
electronically, classifying, via a processing device, web content using the selected classifier model.

2. The method of claim 1 wherein the classifier model selection is done using at least one of: a standard optimization technique and the standard optimization technique with an expectation-maximization technique.

3. The method of claim 1, wherein when the classifier model relates to a Gaussian Process (GP), the method further comprises:
deriving the efficient analytical expressions using Laplace and expectation propagation approximations.

4. The method of claim 1 further comprising:
prior to classifying the web content, accessing a training set having the web content therein.

5. The method of claim 4 further comprising:
testing the selected classifier model using at least one of a plurality of known web content.

6. The method of claim 1, wherein the plurality of predictive performance measures include at least one of: an F-measure, a weight error rate measure and an area under curve of receiver operations characteristics measure.

7. Non-transitory computer readable media comprising program code that when executed by a programmable processor causes the processor to execute a method for generating a classifier model, the computer readable media comprising:
program code for defining a plurality of predictive performance measures based on a leave one out (LOO) cross validation in terms of selectable model parameters;
program code for deriving efficient analytical expressions by approximating one or more analytical expressions based on the plurality of predictive performance measures to compute a LOO predictive performance;
program code for selecting a classifier model based on the LOO predictive performance; and
program code for classifying a web content using the selected classifier model.

8. The computer readable medium of claim 7 wherein the classifier model selection is done using at least one of: a standard optimization technique and the standard optimization technique with an expectation-maximization technique.

9. The computer readable medium of claim 7, wherein when the classifier model relates to a Gaussian Process (GP), the medium further comprises:
program code for deriving the efficient analytical expressions using Laplace and expectation propagation approximations.

10. The computer readable medium of claim 7 further comprising:
program code for, prior to classifying the web content, accessing a training set having the web content therein.

11. The computer readable medium of claim 10 further comprising:
program code for testing the selected classifier model using at least one of a plurality of known web content.

12. The computer readable medium of claim 7, wherein the plurality of predictive performance measures include at least one of: an F-measure, a weight error rate measure and an area under curve of receiver operations characteristics measure.

13. An apparatus for generating a classifier model, the apparatus comprising:
a memory device having executable instructions stored therein; and
a processing device, in response to the executable instructions, operative to:
define a plurality of predictive performance measures based on a leave one out (LOO) cross validation in terms of selectable model parameters;
derive efficient analytical expressions by approximating one or more analytical expressions based on the plurality of predictive performance measures to compute a LOO predictive performance;
select a classifier model based on the LOO predictive performance; and
classify web content using the selected classifier model.

14. The apparatus of claim 13 wherein the classifier model selection is done using at least one of: a standard optimization technique and the standard optimization technique with an expectation-maximization technique.

15. The apparatus of claim 13, wherein when the classifier model relates to a Gaussian Process (GP), the processing device, in response to executable instructions, is further operative to:
derive the efficient analytical expressions using Laplace and expectation propagation approximations.

16. The apparatus of claim 13, the processing device, in response to executable instructions, is further operative to:
prior to classifying the web content, access a training set having the web content therein.

17. The apparatus of claim 16, the processing device, in response to executable instructions, is further operative to:
test the selected classifier model using at least one of a plurality of known web content.

18. The apparatus of claim 13, wherein the plurality of predictive performance measures include at least one of: an F-measure, a weight error rate measure and an area under curve of receiver operations characteristics measure.

* * * * *